Nov. 22, 1960
G. C. LACY, JR
2,960,999
LIQUID FERTILIZER APPLICATOR
Filed Aug. 15, 1958
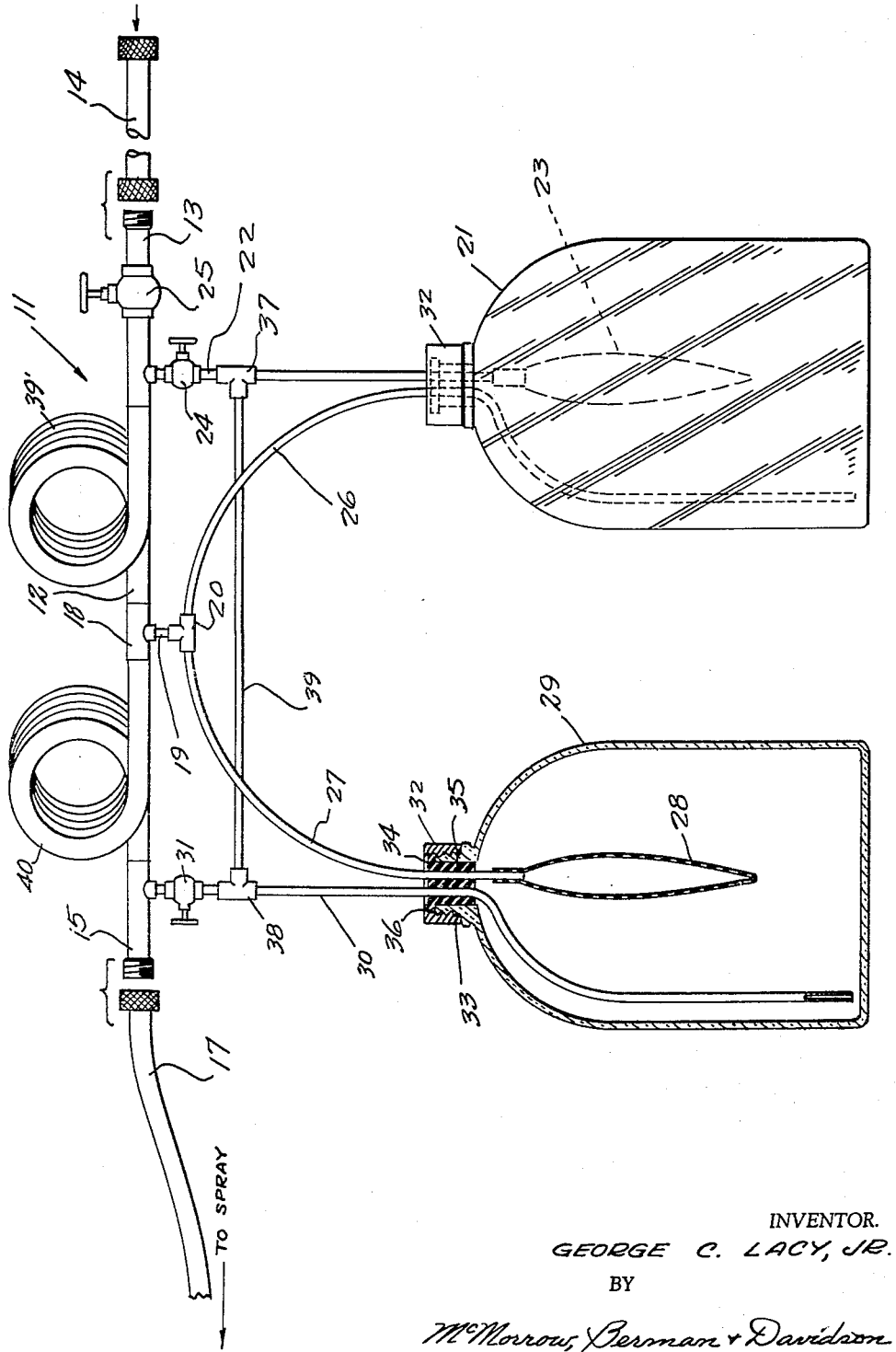
INVENTOR.
GEORGE C. LACY, JR.
BY
McMorrow, Berman + Davidson
ATTORNEYS United States Patent Office 2,960,999
Patented Nov. 22, 1960

2,960,999

LIQUID FERTILIZER APPLICATOR

George C. Lacy, Jr., 2152 Cleveland, Paris, Tex.

Filed Aug. 15, 1958, Ser. No. 755,166

2 Claims. (Cl. 137—564.5)

This invention relates to liquid mixing and distributing devices, and more particularly to an apparatus for mixing and distributing liquid fertilizer, insecticide, or other material wherein a chemical in either liqud or soluble form must be mixed with water or other liquid intended to be employed as a carrier for the material.

A main object of the invention is to provide a novel and improved liquid mixing and distributing device which is simple in construction, which is easy to use, and which is arranged so that the liquid mixing and distributing action thereof may be continuously maintained as long as required.

A further object of the invention is to provide an improved liquid mixing and distributing apparatus which involves relatively inexpensive components, which is reliable in operation, and which may be controlled to provide accurate proportioning of the resultant mixture.

Further objects and advantages of the invention will become apparent from the following description and claims, and from the accompanying drawing, wherein the single figure illustrates a typical embodiment of a liquid mixing and distributing device according to the present invention.

Referring to the drawings, the liquid mixing and distributing device is designated generally at 11 and comprises a main mixing conduit 12 having an inlet end 13 adapted to be connected to a supply source of liquid, for example, to a supply of water under pressure, as by a connecting conduit 14. The main mixing conduit 12 is further provided with an outlet end 15 adapted to be connected by a suitable conduit, such as a flexible hose 17 to a spray nozzle or other distributing device.

The intermediate portion of the main mixing conduit 12 comprises a T-fitting 18 having the laterally projecting stem element 19 which is connected to another T-fitting 20. Designated at 21 is a first supply vessel, comprising a conventional jar, adapted to contain material to be mixed with the water from the supply conduit 14, for example, liquid fertilizer. Designated at 22 is a first conduit connecting the inlet portion of the mixing conduit 12 to the vessel 21, said first conduit being connected to an inflatable bag or balloon 23 in the vessel 21. The conduit 22 is provided with a manually operated control valve 24 located adjacent the connection to the main mixing conduit 12, as is clearly shown in the drawing. The main mixing conduit 12 is provided in its inlet portion with a manually controlled valve 25 located ahead of the connection of conduit 22 to the main mixing conduit 12.

Designated at 26 is a second connecting conduit member connecting one branch of the T-fitting 20 to the interior of the vessel 21, the conduit 26 extending into the bottom portion of the vessel 21 and opening at said bottom portion.

Designated at 27 is a third conduit which connects the opposite branch of the T-fitting 20 to an inflatable bag or balloon 28 contained in another vessel, shown at 29, similar to the vessel 21, and adapted to contain liquid fertilizer or similar liquid material to be mixed with the water in the mixing conduit 12. A fourth conduit 30 connects the outlet end 15 of mixing conduit 12 to the interior of the vessel 29, said conduit 30 being provided with a manually controlled valve 31 located adjacent the connection to the outlet end 15 of conduit 12, and extending into the vessel 29, terminating at the bottom portion thereof and opening at said bottom portion.

As shown, the respective conduits 22, 26 and 27, 30 extend through the neck portions of the vessels 21 and 29, said neck portions being sealed around the conduits. For example, the neck portions may be provided with external threads 33 which are threadedly engaged by internally threaded clamping rings 32, said clamping rings being provided at their top portions with inwardly extending clamping flanges 34. The respective pairs of conduits 26, 22 and 30, 27 extend through respective stopper members 35 of rubber or other suitable resilient deformable material, said stopper members being engaged in the neck portions of the vessels 21 and 29 and having outwardly extending annular top sealing flanges 36 engaged beneath the top rims of the neck portions of the vessels and the rigid inwardly projecting clamping flanges 34 of the clamping rings 32. Thus, when the rings 32 are tightened, the stopper members 35 tightly seal the neck portions of the vessels around the conduits extending thereinto.

As will be readily apparent, the clamping rings 32 may be readily loosened to allow the depleted vessels to be quickly replaced with new vessels, when required.

The respective conduits 22 and 30 are provided below their associated valves 24 and 31 with T-fittings 37 and 38, the stem portions of said T-fittings being communicatively connected by a cross conduit 39.

The mixing conduit 12 includes a large number of coils 39' between the intermediate T-fitting 18 and the inlet end portion thereof. The coils 39' impose substantial resistance to flow because of their length and thus provide a substantially pressure drop between the inlet end portion and the intermediate portion of the mixing conduit 12 responsive to the flow of liquid through the mixing conduit. Similar coils, shown at 40, are included between the T-fitting 18 and the outlet end portion of the mixing conduit 12, said coils 40 providing a further pressure drop between T-fitting 18 and the connection of conduit 30 to the mixing conduit.

Any other suitable means, such as constrictions, may be employed in place of the coils 39', 40, to provide pressure drops thereacross responsive to the flow of liquid therethrough, in accordance with the spirit of the present invention.

In operation, the main valve 25 is first closed and the respective vessels 21 and 29 are connected to the device in the manner illustrated in the drawing, said vessels 21 and 29 being filled with the liquid which it is desired to mix with water and to distribute at the distributing conduit 17. It will be assumed that both of the inflatable balloon members 23 and 28 are in deflated condition at the beginning of the operation, as illustrated in the drawing. Valve 31 is first closed, after which main valve 25 is opened, allowing water under pressure to enter the mixing conduit 12. The valve 24 is then opened to allow the water under pressure to enter the inflatable balloon member 23 at a desired rate, causing said balloon to become inflated, whereby the liquid in the vessel 21 is forced out through the conduit 26 and through the T-fitting 20 and conduit 19 into the intermediate portion of the mixing conduit 12, mixing with the water and being discharged from the mixing conduit into the distributing conduit 17. Since valve 31 is closed, the inlet water pressure from the portion 13 of conduit 12 is transmitted to the interior of the vessel 29 through the cross conduit 39 and the conduit 30, preventing the balloon member 28 in vessel 29 from being inflated by the fluid pressure developed in vessel 21 resulting from the inflation of the balloon 23.

After the vessel 21 has been substantially depleted and it is desired to continue the mixing and distributing operation, the valve 24 is closed and the valve 31 is opened, whereby the liquid pressure at the intermediate portion of the mixing conduit 12 is transmitted through the conduit 27 to the balloon member 28, causing said balloon member to become inflated and causing the inflation of said balloon member to force the liquid in vessel 29 out through the conduit 30 to the mixing conduit 12. Thus, the liquid material in the vessel 29 is mixed with the water in the conduit 12 at the outlet portion of the mixing conduit, being thus conveyed to the discharge conduit 17 for distribution.

At this point, if so desired, the depleted vessel 21 may be disconnected from the conduits 26 and 22 and may be replaced by a new vessel containing additional material to be mixed and distributed. Thus, in order to replace a depleted conduit, the main control valve 25 is first closed, after which the associated control valve 24 or 31 is opened to allow the inflated balloon member associated therewith to become deflated. The clamping ring 32 of the depleted vessel is then unfastened, allowing the vessel to be detached from its associated sealing stopper 35 and allowing the new vessel to be substituted in place thereof, after which the sealing ring 32 may be threadedly engaged with the threads 33 on the neck of the new vessel and may be tightened to seal the stopper in the neck and to restore the conditions illustrated in the drawing. The apparatus may then be operated in the manner above described to dispense the liquid material in the new vessel through the mixing conduit 12 by allowing liquid under pressure to enter and inflate its balloon member, as above described, with the control valve associated with the other vessel in a closed position.

While a specific embodiment of an improved liquid mixing and distributing device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a liquid mixing and distributing device, a mixing conduit including an inlet and adapted to be connected to a supply source of liquid under pressure, an outlet end and an intermediate portion between the inlet and outlet ends, a pair of vessels containing a different liquid, first conduit means connected to said mixing conduit adjacent said inlet end and extending into one of the vessels, an inflatable member communicatively connected to the end of said first conduit means in said vessel, second conduit means connected to the intermediate portion of said mixing conduit and extending into said one of the vessels and being in communication with its interior, third conduit means connected to the intermediate portion of the mixing conduit and extending into the other vessel, a further inflatable member communicatively connected to the end of said third conduit means in said other vessel, fourth conduit means connected to said mixing conduit adjacent its outlet end and extending into said other vessel, a cross conduit connecting said first and fourth conduit means, respective control valves in said first and fourth conduit means between the connections of said cross conduit thereto and the mixing conduit, means sealing said vessels around the respective conduit means extending thereinto, means in the mixing conduit imposing a substantial resistance to flow between the connection of the first conduit means thereto and its intermediate portion, and means in the mixing conduit imposing a substantial resistance to flow between said intermediate portion and the connection of the fourth conduit means to said mixing conduit.

2. In a liquid mixing and distributing device, a mixing conduit including an inlet and adapted to be connected to a supply source of liquid under pressure, an outlet end and an intermediate portion between the inlet and outlet ends, a pair of vessels containing a different liquid, first conduit means connected to said mixing conduit adjacent said inlet end and extending into one of the vessels, an inflatable member communicatively connected to the end of said first conduit means in said vessel, second conduit means connected to the intermediate portion of said mixing conduit and extending into said one of the vessels and being in communication with its interior, third conduit means connected to said intermediate portion of the mixing conduit and extending into the other vessel, a further inflatable member communicatively connected to the end of said third conduit means in said other vessel, fourth conduit means connected to said mixing conduit adjacent its outlet end and extending into said other vessel, a cross conduit connecting said first and fourth conduit means, respective control valves in said first and fourth conduit means between the connections of said cross conduit thereto and the mixing conduit, and means detachably engaging said vessels and sealing said vessels around the respective conduit means extending thereinto, and respective means in said mixing conduit between said intermediate portion and the connections of the first and fourth conduit means thereto constructed and arranged to impose a substantial resistance to flow and thereby provide substantial pressure drops thereacross responsive to the flow of liquid therethrough.

References Cited in the file of this patent

UNITED STATES PATENTS

| | | |
|---|---|---|
| 1,085,348 | Ledoux | Jan. 27, 1914 |
| 2,323,341 | McGill | July 6, 1943 |
| 2,393,854 | Carpenter | Jan. 29, 1946 |
| 2,618,510 | Mills | Nov. 18, 1952 |
| 2,673,013 | Hester | Mar. 23, 1954 |
| 2,723,161 | Covington | Nov. 8, 1955 |
| 2,824,573 | Mason | Feb. 25, 1958 |